(12) United States Patent
Nhep

(10) Patent No.: US 9,081,152 B2
(45) Date of Patent: Jul. 14, 2015

(54) ADAPTER PACK WITH REMOVABLE SLEEVES

(71) Applicant: ADC Telecommunications, Inc., Berwyn, PA (US)

(72) Inventor: Ponharith Nhep, Savage, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 14/015,598

(22) Filed: Aug. 30, 2013

(65) Prior Publication Data

US 2014/0064690 A1 Mar. 6, 2014

Related U.S. Application Data

(60) Provisional application No. 61/695,189, filed on Aug. 30, 2012.

(51) Int. Cl.
*G02B 6/36* (2006.01)
*G02B 6/00* (2006.01)
*G02B 6/38* (2006.01)

(52) U.S. Cl.
CPC ............ *G02B 6/3628* (2013.01); *G02B 6/3825* (2013.01); *G02B 6/3898* (2013.01); *Y10T 29/49863* (2015.01)

(58) Field of Classification Search
CPC ..................................................... G02B 6/3893
USPC ................................................. 385/134–138
See application file for complete search history.

(56) References Cited

U.S. PATENT DOCUMENTS

| | | |
|---|---|---|
| 5,067,783 A | 11/1991 | Lampert |
| 5,317,663 A | 5/1994 | Beard et al. |
| 5,542,015 A | 7/1996 | Hultermans et al. |
| 5,737,464 A | 4/1998 | Underwood et al. |
| 5,838,855 A | 11/1998 | Stephenson |
| 5,887,095 A | 3/1999 | Nagase et al. |
| 6,367,984 B1 | 4/2002 | Stephenson |
| 6,508,593 B1 | 1/2003 | Farnsworth et al. |
| 7,377,697 B2 | 5/2008 | Kahle |
| 7,862,243 B2 | 1/2011 | Kahle |
| 8,123,415 B2 | 2/2012 | Kahle |
| 8,313,248 B2 | 11/2012 | Kahle |
| 2003/0156797 A1 | 8/2003 | Gherardini |
| 2006/0093274 A1 | 5/2006 | Kahle et al. |
| 2006/0093300 A1* | 5/2006 | Marrs et al. ................... 385/134 |
| 2010/0111484 A1* | 5/2010 | Allen ........................... 385/135 |
| 2011/0229082 A1 | 9/2011 | Kahle |

FOREIGN PATENT DOCUMENTS

| | | |
|---|---|---|
| EP | 0 731 369 A2 | 9/1996 |
| JP | 2000266963 A | 9/2000 |
| JP | 2001033658 A | 2/2011 |

* cited by examiner

*Primary Examiner* — Eric Wong
(74) *Attorney, Agent, or Firm* — Merchant & Gould P.C.

(57) ABSTRACT

A sleeve for an adapter pack includes: a main body; a first axial bore on the main body sized to receive a portion of a first fiber optic connector; a second axial bore on the main body sized to receive a portion of a second fiber optic connector so that a connection is made between the first fiber optic connector and the second fiber optic connector; a first arm extending from the main body; and a second arm extending from the main body, the second arm extending in a direction opposing the first arm. The first and second arms are compressible towards one another as the sleeve is introduced into the adapter pack. When fully inserted, the first and second arms decompress to engage the adapter pack to retain the sleeve within the adapter pack.

3 Claims, 13 Drawing Sheets

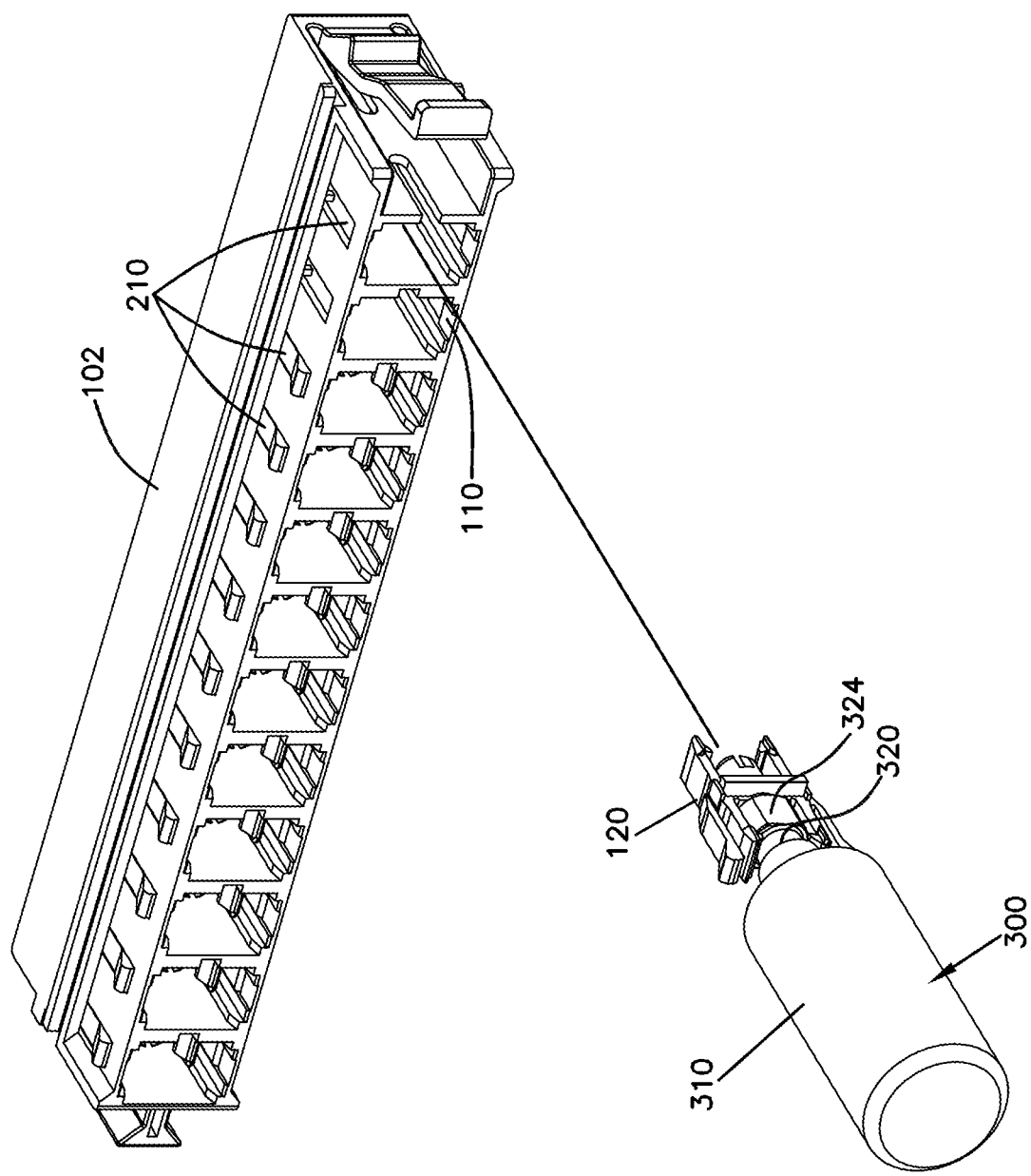

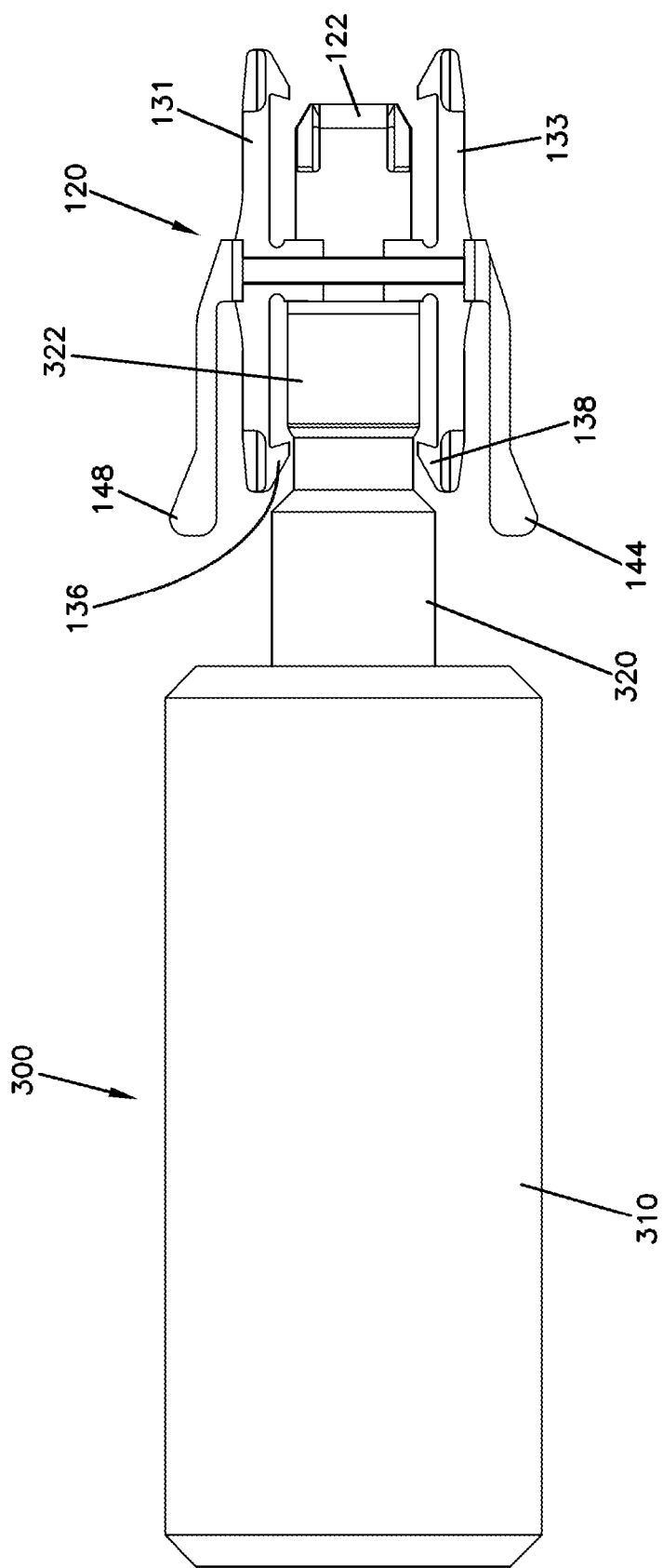

ADAPTER PACK WITH REMOVABLE SLEEVES

RELATED APPLICATION

This application is related to U.S. patent application Ser. No. 10/513,207 filed on Sep. 1, 2005, the entirety of which is hereby incorporated by reference.

BACKGROUND

Optical fibers are typically connected coaxially using a coupling. The optical fiber ends which are to be connected are designed with plug-in connectors (sometimes referred to as split sleeves), which are accommodated by the coupling. The plug-in connectors are designed with ferrules, which are introduced into a sleeve of the corresponding coupling such that their end surfaces come into contact. The sleeve is mounted in a sleeve mount.

For accommodating the plug-in connectors, the sleeve mount is designed, for example, with latching hooks at two ends. The outer shape of the coupling housing is defined by way of the given geometries of known installation openings. It is known, for easy production and installation, for the coupling housing to be configured in two parts, preferably with two identical housing halves. Examples of such coupling housings include U.S. Pat. No. 5,317,663 and Japanese Patent Application JP2000266963.

SUMMARY

In one aspect, a sleeve for an adapter pack includes: a main body; a first axial bore on the main body sized to receive a portion of a first fiber optic connector; a second axial bore on the main body sized to receive a portion of a second fiber optic connector so that a connection is made between the first fiber optic connector and the second fiber optic connector; a first arm extending from the main body; and a second arm extending from the main body, the second arm extending in a direction opposing the first arm. The first and second arms are compressible towards one another as the sleeve is introduced into the adapter pack. When fully inserted, the first and second arms decompress to engage the adapter pack to retain the sleeve within the adapter pack.

In another aspect, an adapter pack includes: a housing defining one or more connector locations, with each of the connector locations defining opposing openings; a sleeve including: a main body; a first axial bore on the main body sized to receive a portion of a first fiber optic connector; a second axial bore on the main body sized to receive a portion of a second fiber optic connector so that a connection is made between the first fiber optic connector and the second fiber optic connector; a first arm extending from the main body, the first arm including a first latching hook; and a second arm extending from the main body, the second arm including a second latching hook and extending in a direction opposing the first arm. The first and second arms of the sleeve are compressible towards one another as the sleeve is introduced into a connector location of the connector locations of the housing. When fully inserted, the first and second arms decompress to engage the openings formed in the connector location to retain the sleeve within the adapter pack.

DESCRIPTION OF THE DRAWINGS

FIG. 7 is a perspective view of an example tool used to insert a sleeve into a housing of the adapter pack of FIG. 1.
FIG. 8 is a first side view of the tool and sleeve of FIG. 7.

DETAILED DESCRIPTION

The present disclosure is directed towards fiber optic connectors. Although not so limited, an appreciation of the various aspects of the present disclosure will be gained through a discussion of the examples provided below.

Figure 1:
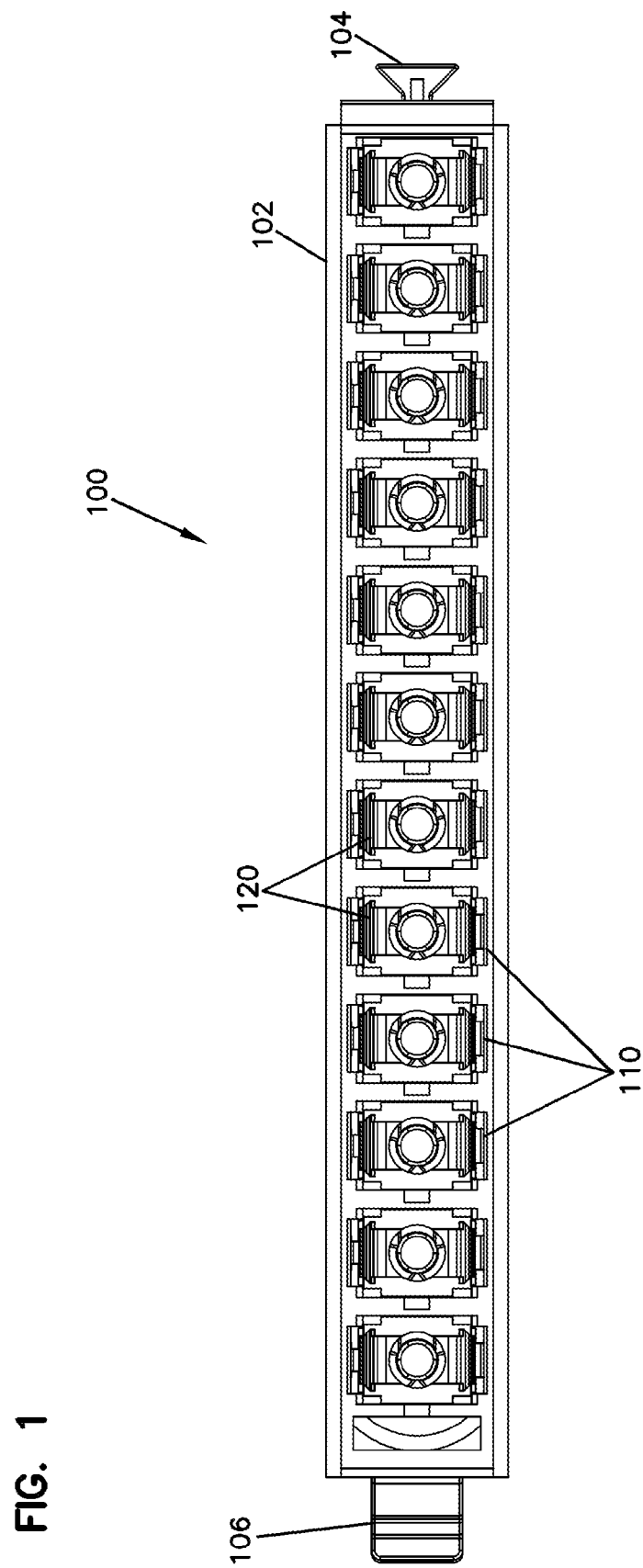
FIG. 1 is front view of an example adapter pack.
Figure 2:
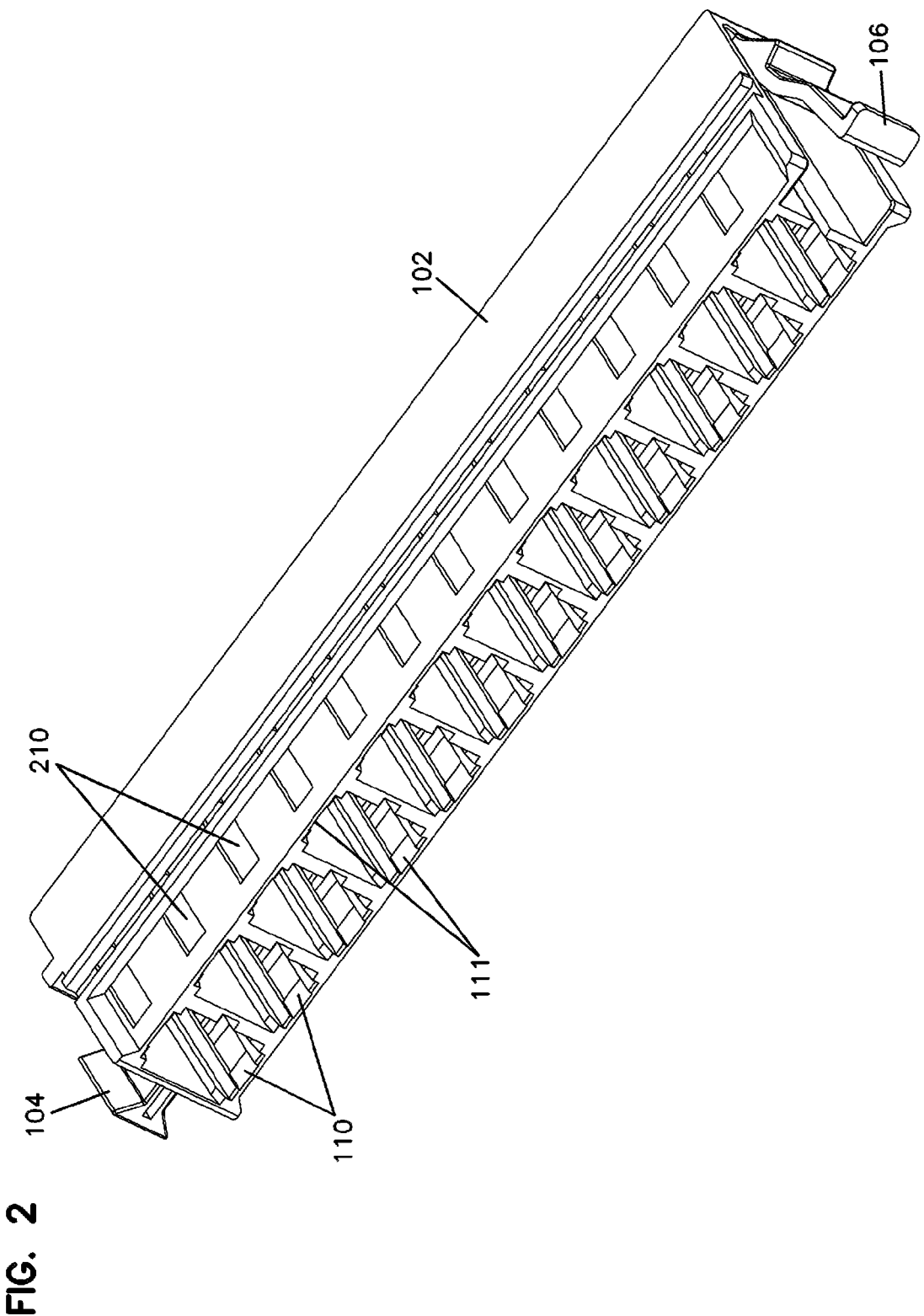
FIG. 2 is a first perspective view of an example housing of the adapter pack of FIG. 1.
Figure 3:
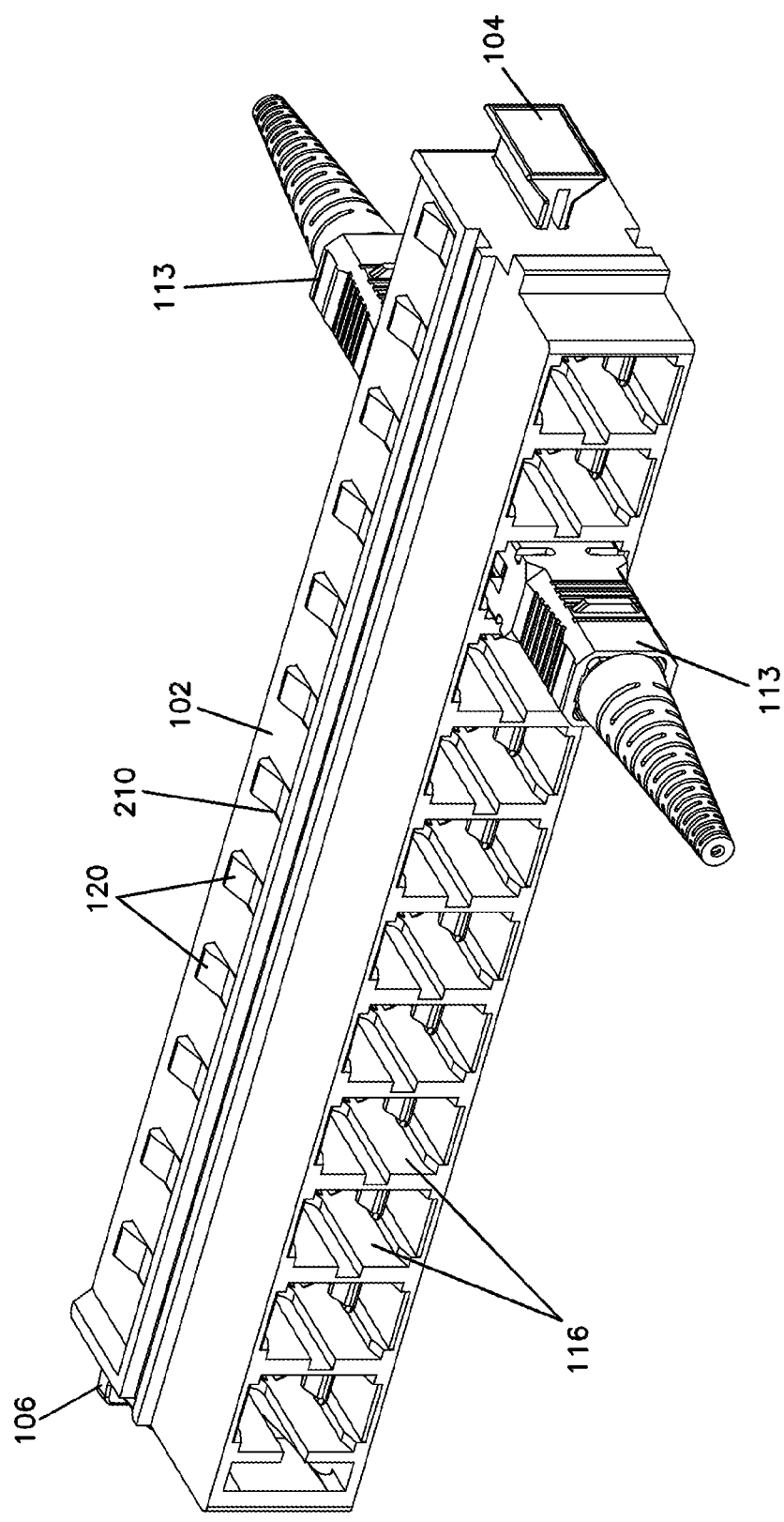
FIG. 3 is a second perspective view of the housing of the adapter pack of FIG. 1 including sleeves and two fiber optic connectors.

FIG. 1 shows an example adapter pack 100 configured to accept a plurality of fiber optic connectors. As shown in FIGS. 2-3, the adapter pack 100 includes a housing 102 with twelve connector locations 110, although more or fewer locations (e.g., six connector locations) can be provided. The housing 102 of the adapter pack 100 includes a member 104 and a clip 106 sized to allow the adapter pack 100 to be connected to a rack or bank of adapter packs 100 within a larger fiber optics system.

Positioned within each of the connector locations 110 of the housing 102 is an example sleeve 120. Each sleeve 120 is configured to accept two fiber optic connectors, with the connectors entering the sleeve 120 at opposite ends of the sleeve 120 to make a connection between the connectors, as described further below.

Figure 4:
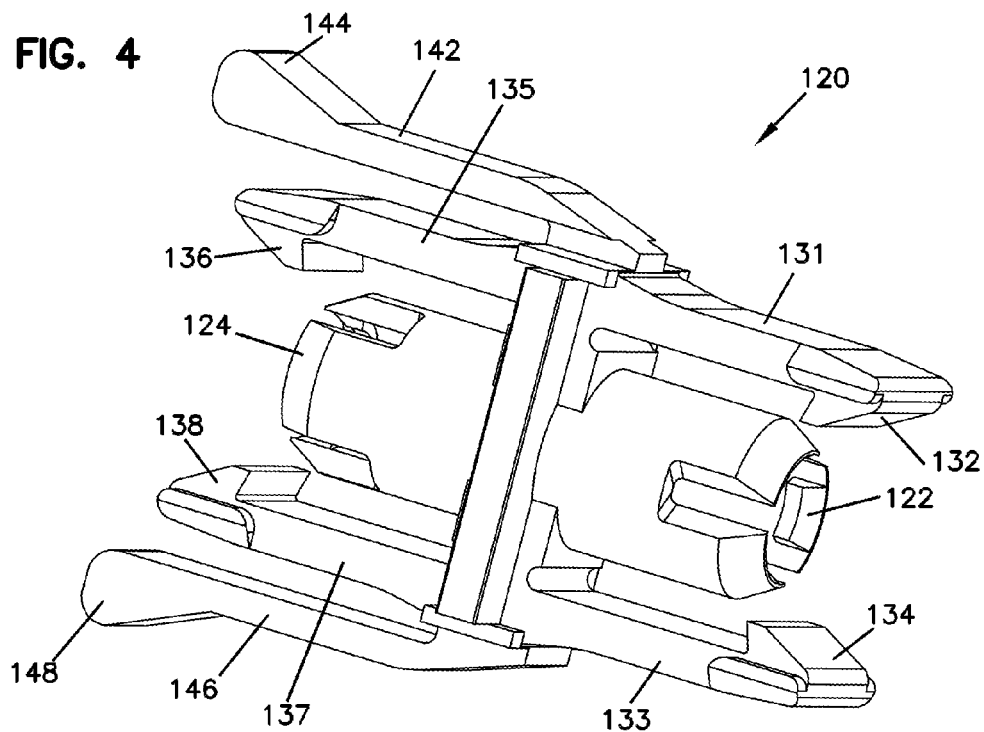
FIG. 4 is a first perspective view of an example sleeve of the adapter pack of FIG. 1.
Figure 5:
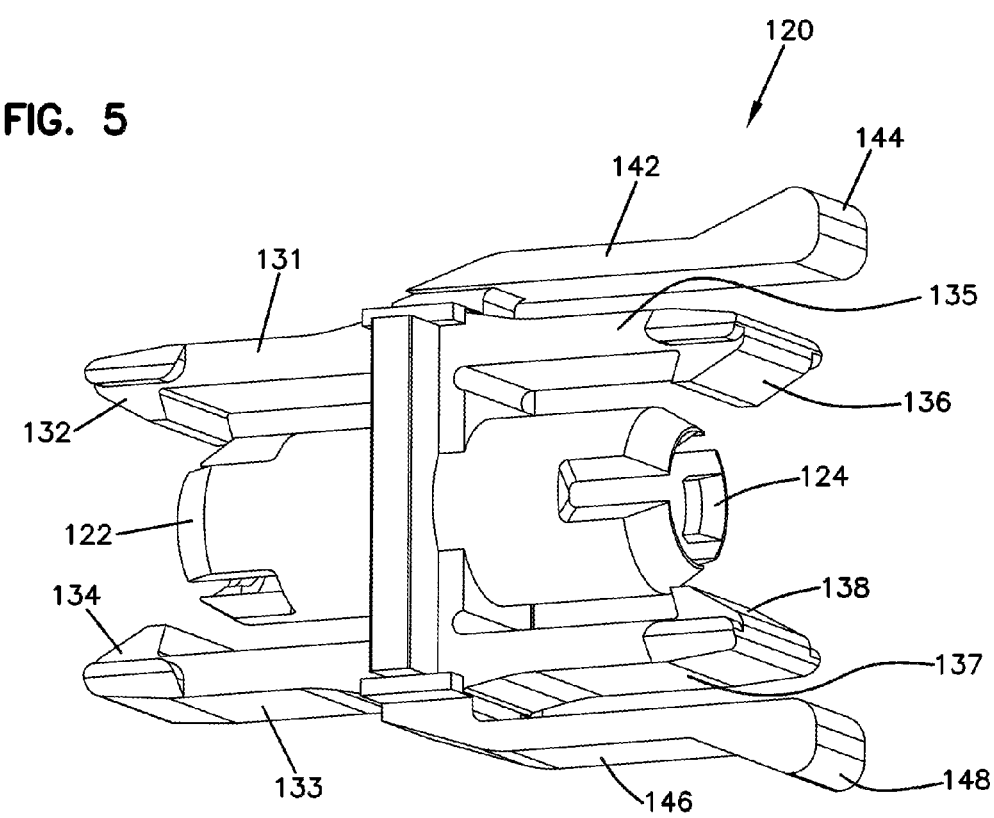
FIG. 5 is a second perspective view of the sleeve of the adapter pack of FIG. 1.
Figure 6:
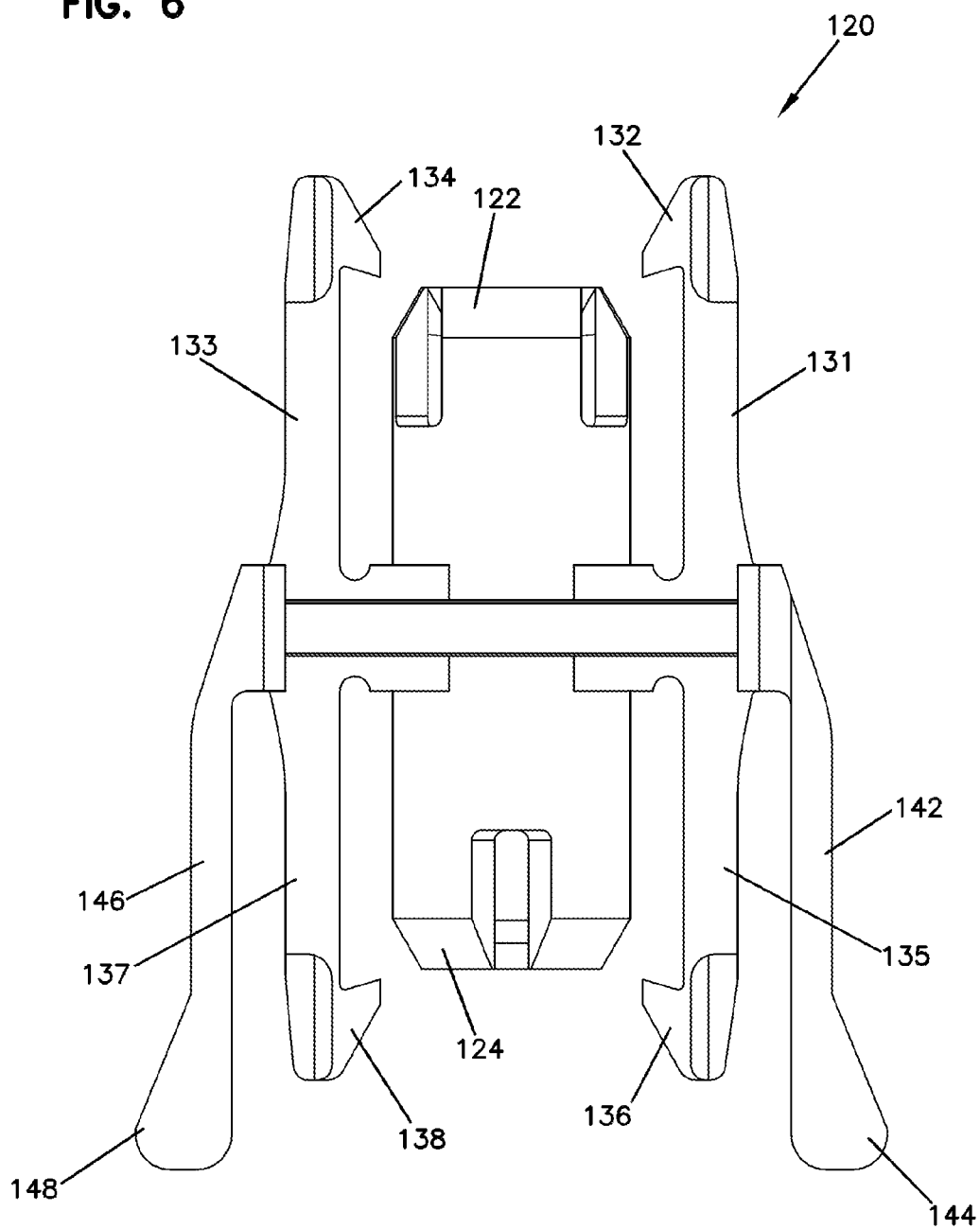
FIG. 6 is a side view of the sleeve of the adapter pack of FIG. 1.

For example, referring now to FIGS. 4-6, the sleeve 120 includes axially-aligned bores 122, 124 sized to receiving fiber optic connectors. When positioned within these bores 122, 124, the fiber optic connectors are guided so that the ferrules of the connectors carrying the fiber optic cable are positioned to make a connection.

The sleeve 120 also includes first arms 131, 133 and second arms 135, 137. Each of the first and second arms 131, 133, 135, 137 includes a latching hook 132, 134, 136, 138, respectively. Each latching hook 132, 134, 136, 138 is positioned to engage the fiber optic connectors as the fiber optic connectors are positioned within the sleeve 120.

Figure 7A:
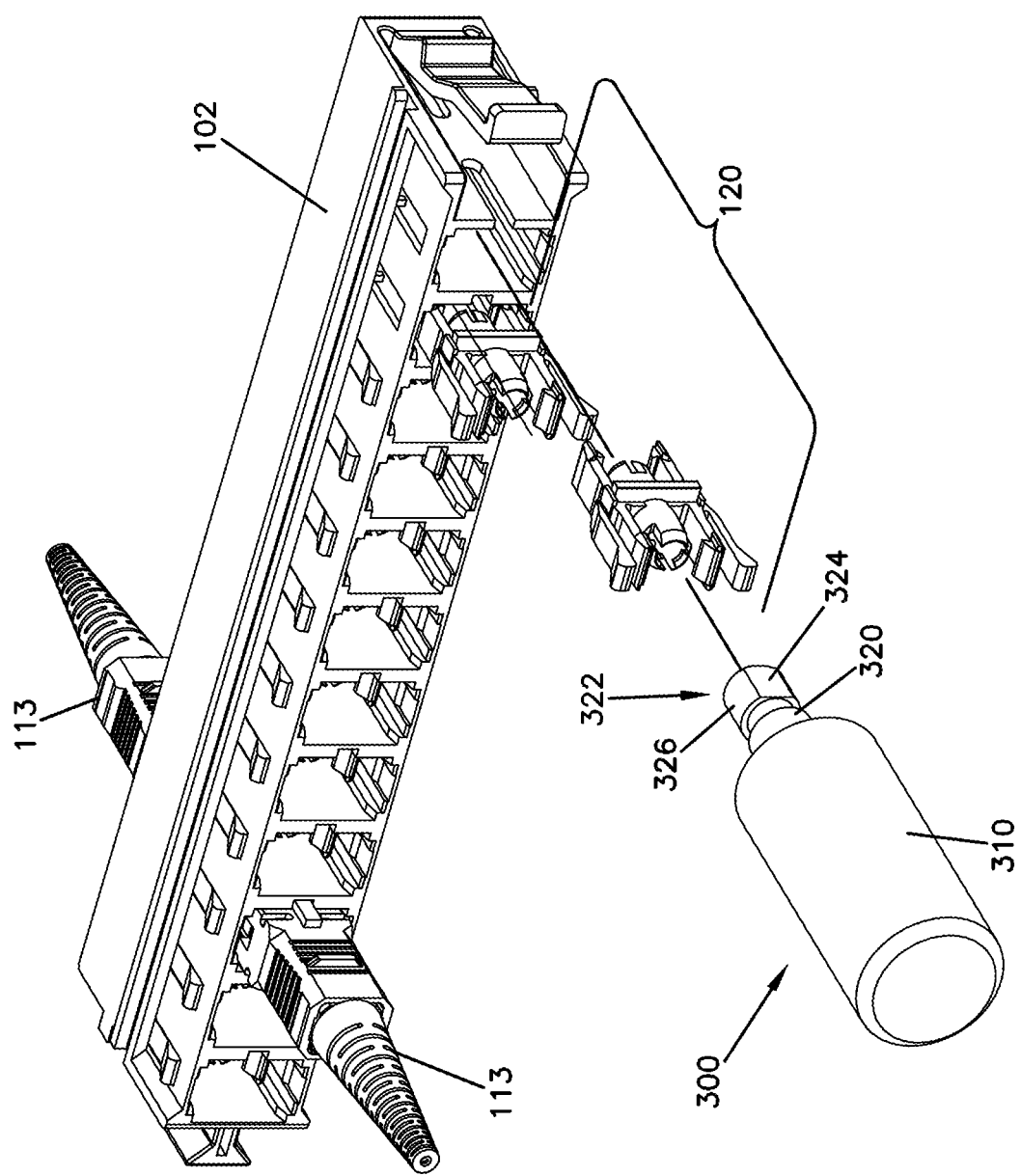
FIG. 7A is another perspective view of the tool of FIG. 7.
Figure 9:
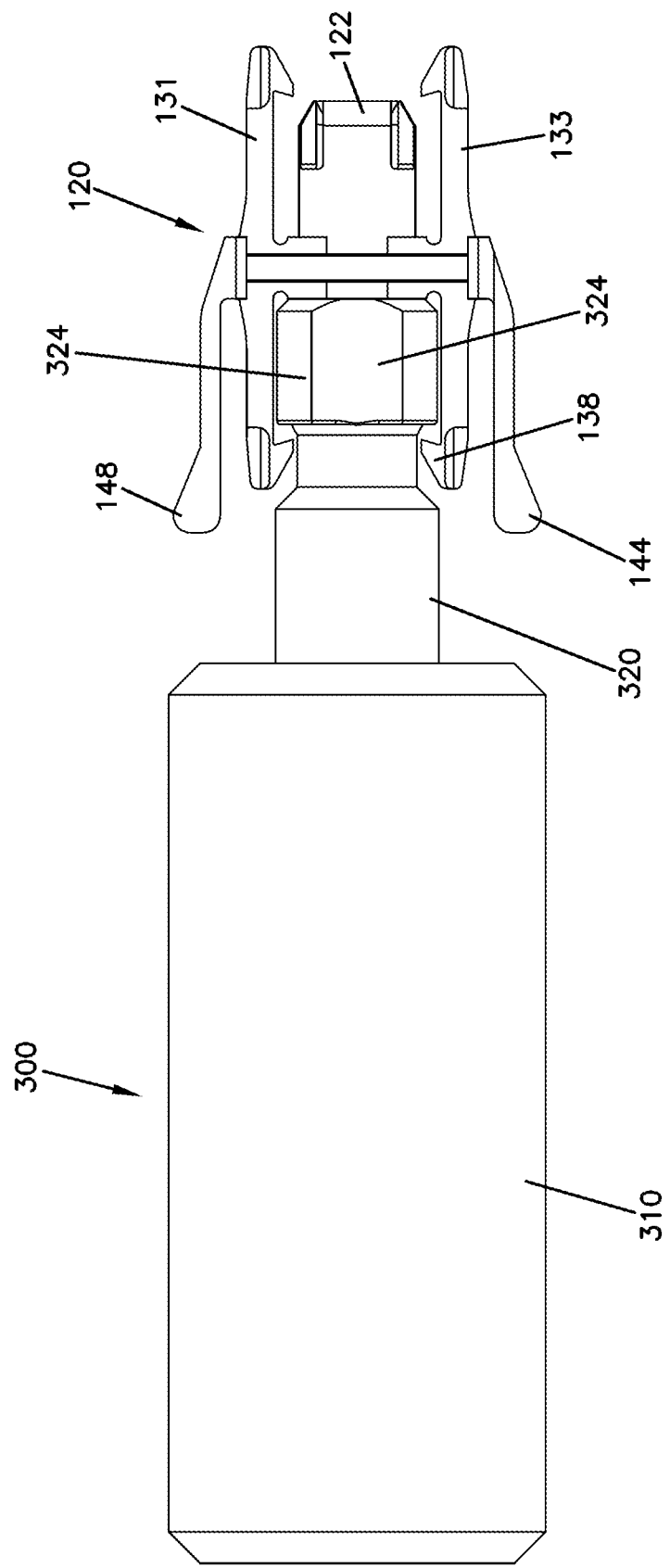
FIG. 9 is a second side view of the tool and sleeve of FIG. 7.
Figure 10:
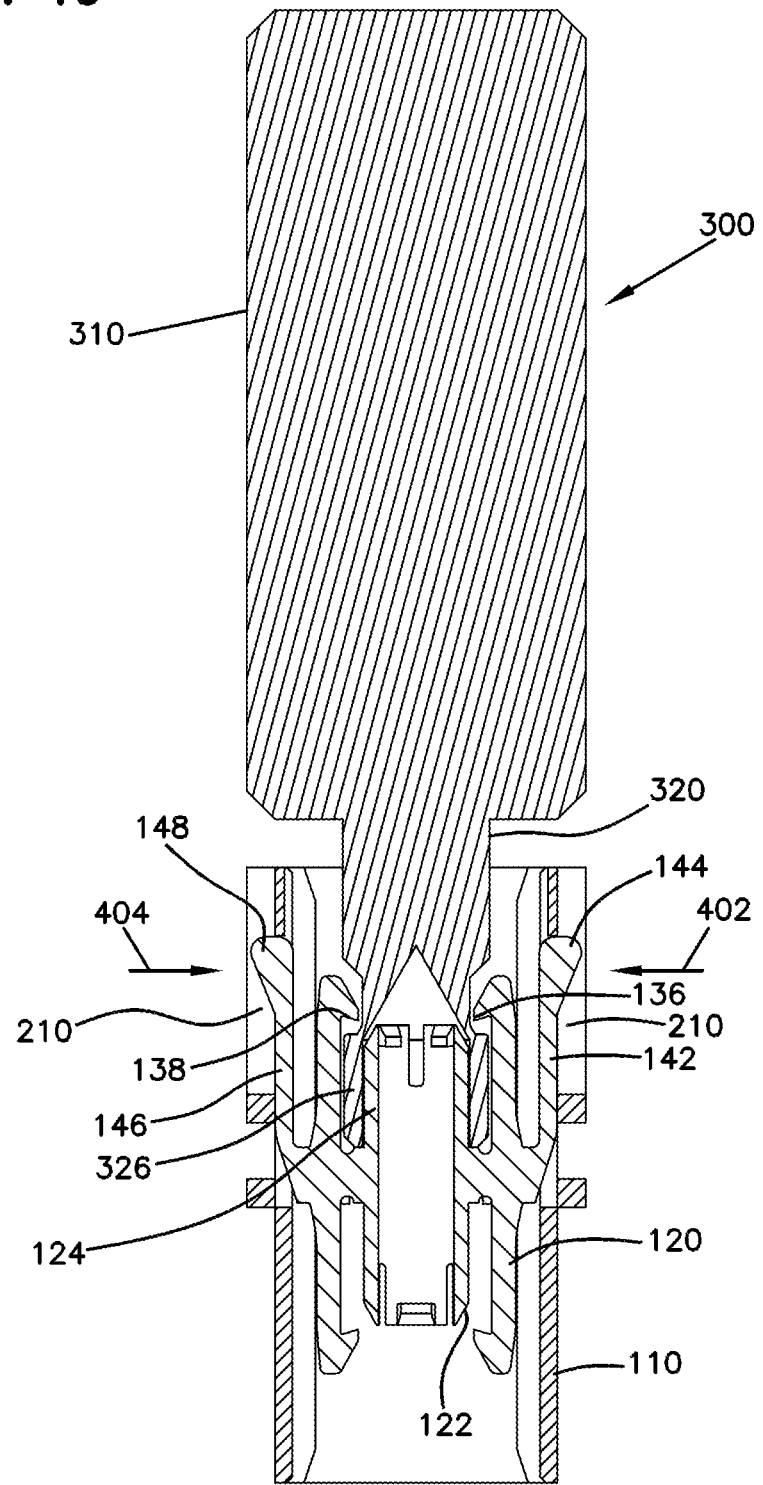
FIG. 10 is a first cross-sectional view of the tool and sleeve of FIG. 7 with the sleeve introduced into the housing of FIG. 2.
Figure 11:
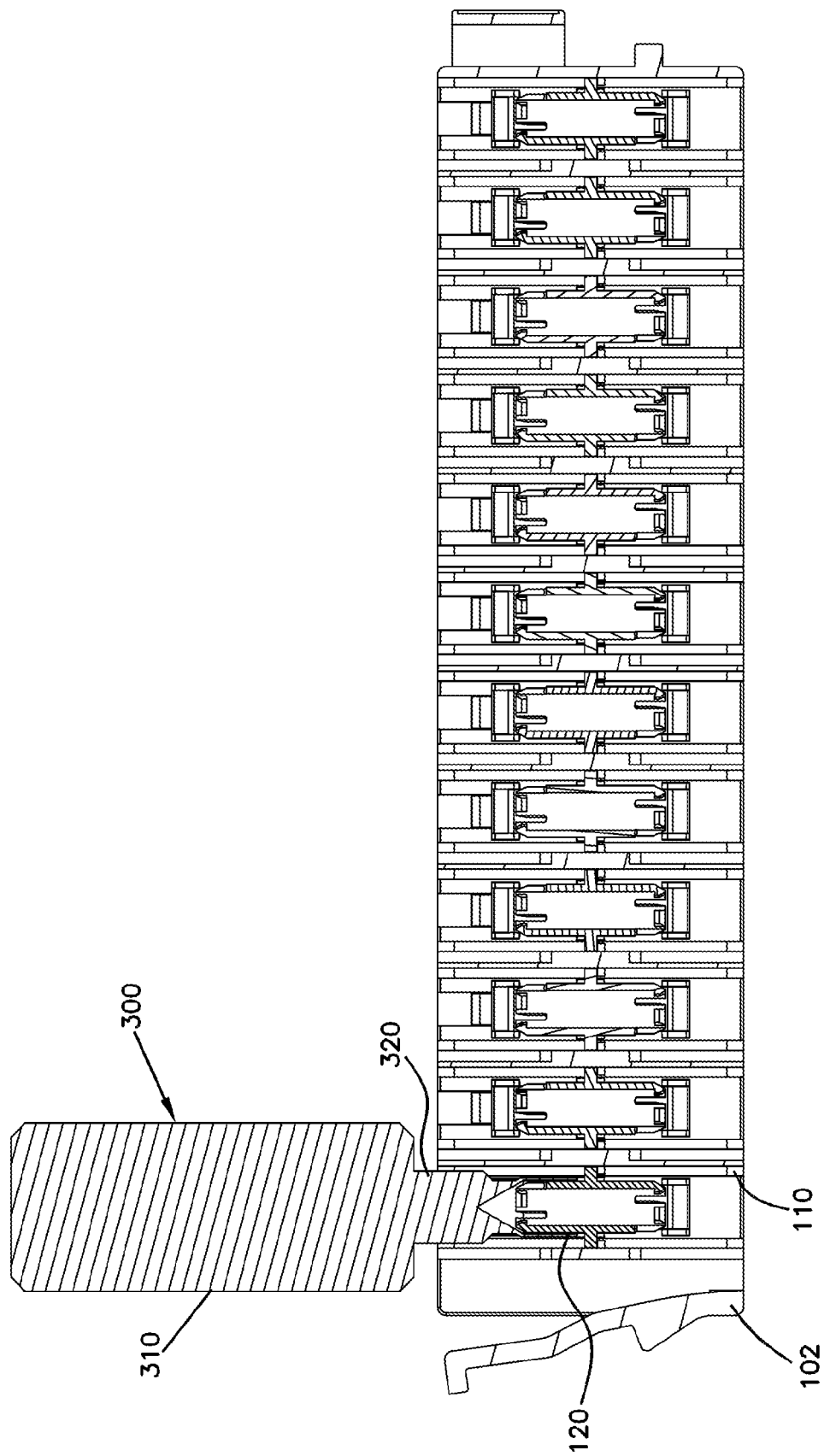
FIG. 11 is a second cross-sectional view of the tool and sleeve of FIG. 7 with the sleeve introduced into the housing of FIG. 2.
Figure 12:
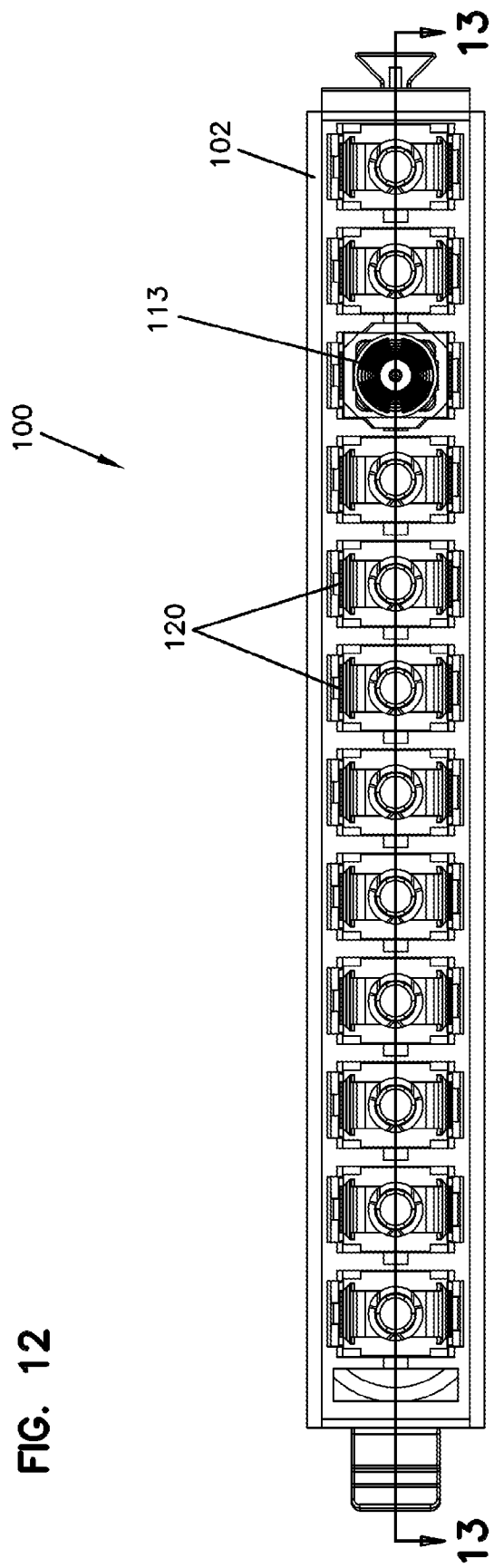
FIG. 12 is another front view of the adapter pack of FIG. 1 including fiber optic connectors.
Figure 13:
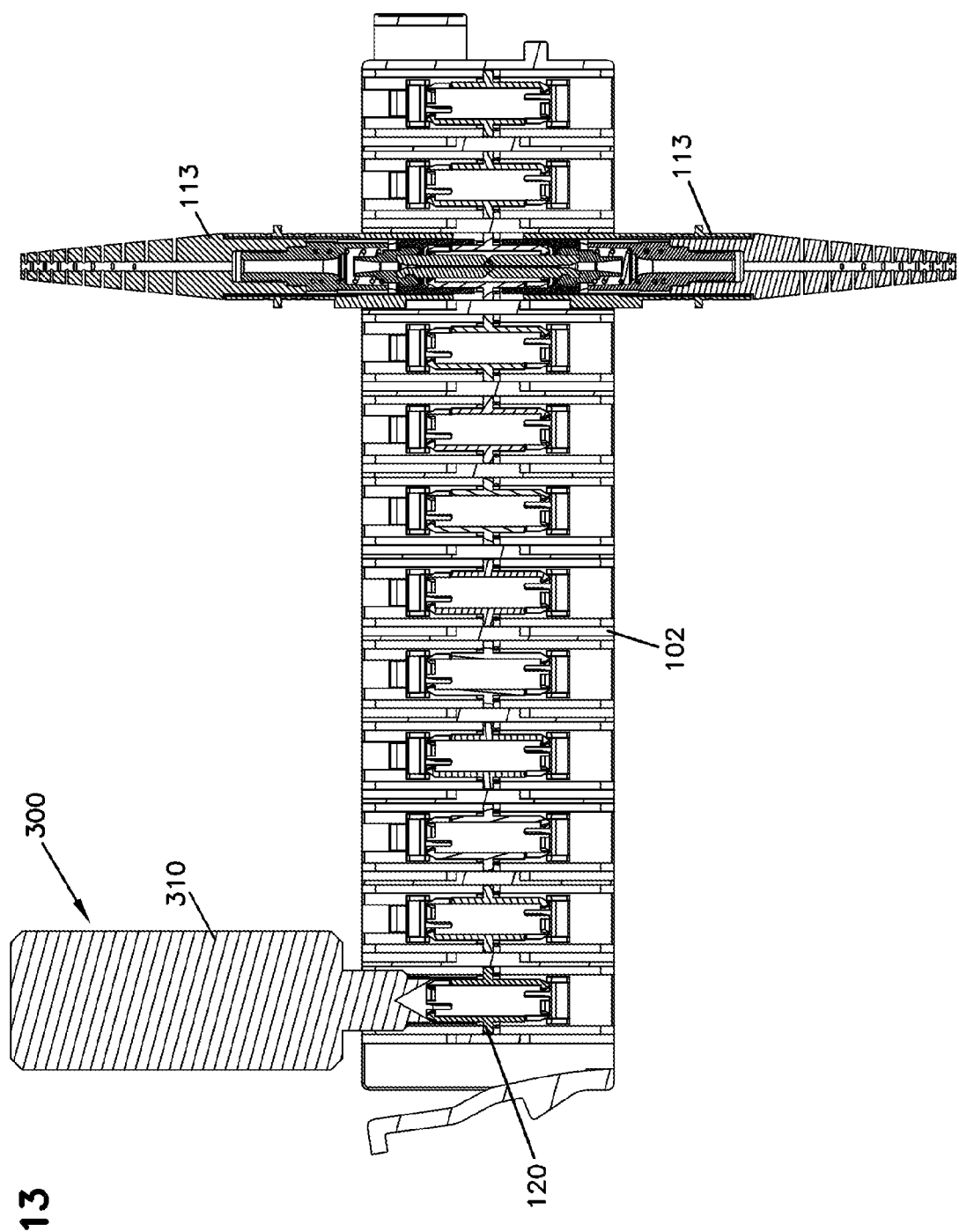
FIG. 13 is a cross-sectional view of the adapter pack of FIG. 12 including the tool of FIG. 7.

Each of the first and second arms 131, 133, 135, 137 can bow or flex slightly outwardly away from the opposite respective arm as the fiber optic connector is inserted into the bore 122, 124 until the latching hooks 132, 134, 136, 138 engage structure on the fiber optic connector to maintain the connection between the fiber optic connector and the sleeve 120. In this example, the fiber optic connector is an SC fiber optic connector 113 (see FIGS. 3, 7A, 13), although other connectors, such as FC or LX.5, can also be used.

The sleeve 120 also includes arms 142, 146 extending from the sleeve 120. Each of the arms 142, 146 includes a latching hook 144, 148, respectively. The latching hooks 144, 148 are positioned to engage openings 210 formed on the housing 102 as the sleeve 120 is introduced into the connector locations 110.

Specifically, as the sleeve 120 is pressed into the connector location 110 at channels 111 formed in the connector location 110, the arms 142, 146 compress or bow slightly inwardly towards each other as the arms 142, 146 contact the connector location 110. When the arms 142, 146 reach the openings 210 formed on opposite sides of the connector location 110, the arms 142, 146 move outwardly back to their original positions. The latching hooks 144, 148 are positioned within the openings 210 to hold the sleeve 120 within the connector location 110.

In addition, the sleeve 120 can be removed from the housing 102 by depressing the arms 142, 146 inwardly so that the latching hooks 144, 148 are removed from the openings 210. At this point, the sleeve 120 can be removed from the housing 102 by pushing the sleeve 120 out of the connector location 110. Addition details on inserting and removing the sleeve 120 from the housing 102 are provided below.

Referring now to FIGS. 7-13, an example tool 300 is shown to assist in the insertion and removal of the sleeves 120 from the housing 102. The tool 300 includes a handle portion 310 sized to be held in a hand of a user. The tool 300 also includes a front portion 320 sized to engage the sleeve 120.

The front portion 320 includes a head 322 sized to encompass the bore 124 of the sleeve 120. The head 322 is cylindrical and includes two radially opposing flat portions 324 and two radially opposing extended portions 326. With the flat portions 324 oriented towards the latching hooks 136, 138, the head 322 is able to clear the latching hooks 136, 138 of the sleeve 120 to encompass the axial bore 124. See FIG. 8.

Once in this position, the handle portion 310 of the tool 300 is rotated relative to the sleeve 120 so that the extended portions 326 are oriented towards the latching hooks 136, 138. See FIG. 9. In this position, the sleeve 120 is captured on the head 322 of the tool 300 because the latching hooks 136, 138 prevent the sleeve 120 from moving axially away from the head 322.

In this position, the tool 300 can be used to introduce the sleeve 120 into the desired connector location 110. The tool 300 is used to slide the sleeve 120 into the connector location until the latching hooks 144, 148 of the sleeve 120 are positioned to engage the openings 210 formed on the housing 102. See FIGS. 10-11.

In this position, the handle portion 310 of the tool 300 is rotated relative to the sleeve 120 so that the flat portions 324 are again oriented towards the latching hooks 136, 138. In this position, the head 322 can clear the latching hooks 136, 138, and the tool 300 can be removed axially from the sleeve 120, leaving the sleeve 120 in position within the connector location 110.

Conversely, the sleeve 120 can be removed from the connector location 110 as follows. The tool is introduced so that the flat portions 324 of the head 322 are oriented towards the latching hooks 136, 138. This allows the head 322 to clear the latching hooks 136, 138.

The handle portion 310 of the tool 300 is then rotated relative to the sleeve 120 so that the extended portions 326 are oriented towards the latching hooks 136, 138. See FIG. 10. In this position, the sleeve 120 is captured on the head 322 of the tool 300 because the latching hooks 136, 138 prevent the sleeve 120 from moving axially away from the head 322.

Next, the user depresses the latching hooks 144, 148 of the sleeve 120 inwardly in directions 402, 402 so that the latching hooks 144, 148 disengage the openings 210. At this point, the tool 300 is moved axially away from the housing 102 to remove the sleeve 120 from the housing 102. When the sleeve 120 clears the housing 102, the latching hooks 144, 148 return to their normal positions. The sleeve 120 can be removed from the tool 300 by rotating the tool 300 relative to the sleeve 120 so that the flat portions 324 are again oriented towards the latching hooks 136, 138. In this position, the head 322 can clear the latching hooks 136, 138, and the tool 300 can be removed axially from the sleeve 120.

In other examples, the sleeve 120 can be removed from the housing 102 without the use of a tool. For example, the user can depress the latching hooks 144, 148 and push the sleeve 120 axially from the connector location using a finger. Other configurations are possible.

There are one or more advantages associated with the example adapter pack described herein. For example, one or more of the sleeves can be inserted and removed from the adapter pack. In this configuration, it is possible to replace specific sleeves without disposing of the entire adapter pack. Through use of the tool, the sleeves can easily be secured within the housing and removed from the housing when desired.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of inserting and removing a sleeve from an adapter pack, the method comprising:
   compressing first and second arms of the sleeve;
   inserting the sleeve into a connector location of the adapter pack;
   releasing the first and second arms of the sleeve to engage the adapter pack to retain the sleeve within the connector location;
   rotating a tool relative to the sleeve so that the head of the tool engages the sleeve;
   removing the sleeve from the connector location of the adapter pack;
   rotating the tool further relative to the sleeve so that the head of the tool disengages the sleeve; and
   removing the tool from the sleeve.

2. The method of claim 1, further comprising allowing a latching hook on each of the first and second arms to engage respective openings formed in the adapter pack.

3. The method of claim 2, further comprising:
   compressing the first and second arms of the sleeve to disengage the first and second arms from the openings formed in the connector location on the adapter pack; and
   sliding the sleeve out of the connector location to remove the sleeve from the adapter pack.

* * * * *